(12) United States Patent
Augeri (10) Patent No.: US 6,636,887 B1
(45) Date of Patent: Oct. 21, 2003

(54) TELE-JAM SYSTEM AND METHOD FOR REAL-TIME MUSICAL INTERACTION

(76) Inventor: Mark A. Augeri, 419 Great Rd., #15, Acton, MA (US) 01720

( * ) Notice: Subject to any disclaimer, the term of this patent is extended or adjusted under 35 U.S.C. 154(b) by 0 days.

(21) Appl. No.: 09/323,246

(22) Filed: Jun. 1, 1999

Related U.S. Application Data

(60) Provisional application No. 60/087,681, filed on Jun. 2, 1998.

(51) Int. Cl.$^7$ .............................................. G06F 15/16
(52) U.S. Cl. ........................ 709/203; 370/276; 370/285
(58) Field of Search .......................... 709/203; 370/276, 370/285

(56) References Cited

U.S. PATENT DOCUMENTS

| | | | |
|---|---|---|---|
| 5,489,103 A | | 2/1996 | Okamoto |
| 5,515,296 A | | 5/1996 | Agarwal |
| 5,586,121 A | * | 12/1996 | Moura et al. ............... 370/276 |
| 5,586,257 A | | 12/1996 | Perlman |
| 5,630,757 A | | 5/1997 | Gagin et al. |
| 5,674,003 A | | 10/1997 | Andersen et al. |
| 5,675,375 A | | 10/1997 | Riffee |
| 5,818,845 A | * | 10/1998 | Moura et al. ............... 370/285 |
| 5,838,909 A | * | 11/1998 | Roy et al. ..................... 463/42 |
| 6,370,564 B2 | * | 4/2002 | Bretscher ..................... 709/203 |

* cited by examiner

Primary Examiner—Krisna Lim
(74) Attorney, Agent, or Firm—James Creighton Wray; Meera P. Narasimhan (57) ABSTRACT

The invention provides tele-jam a system and methods for establishing ensembles or groups of participants by a variety of original organizational methods such that the participants interact in real-time (quasi-real-time) in a desired format (strictly predefined format, loosely defined format, or spontaneous format). A host system is provided having servers and client electronic apparatuses connected to the host system by electronic data network. A database of characteristics is stored in the host system, the characteristics including musical details, queries, responses triggered by queries for classifying users based on queried, experimentally detected, or previously stored data including network data transfer delay. Data streams are formed from user's input data and placed on queues corresponding to the particular classifications, and groups of arranged users. Algorithms in the system act on the supplied and/or detected information with capability for subsequently switching/bridging together. The data streams (audio signals) from each client apparatus of the formed group(s) are combined and the resultant combined data stream (signal) returned to each client apparatus for achieving real-time full-duplex musical interaction.

43 Claims, 4 Drawing Sheets

TELE-JAM SYSTEM AND METHOD FOR REAL-TIME MUSICAL INTERACTION

BACKGROUND OF THE INVENTION

This application claims the benefit of U.S. Provisional Application No. 60/087,681, filed Jun. 2, 1998.

SUMMARY OF THE INVENTION

This application claims the priority of U.S. Provisional Application, Serial No. 60/087,681 filed Jun. 2, 1998.

The system described herein as the "Tele-Jam System" is designed to link musicians from remote locations via modern means of communication, such as ISDN, Internet, Broadband, and Plain Old Telephone Service (POTS), via a telephony/communications server. The server receives requests for services and matches participants into musical groups using data that profiles the participants and specialized algorithms.

The Tele-Jam System allows musicians to interact from remote locations in a real-time environment, such that they have the opportunity to be matched by computer algorithm from a pool of anonymous participants or to have prearranged reservations with familiar musicians. The system utilizes the original matching algorithms in conjunction with original arrangements of available technology to facilitate the objectives of the system.

These and further and other objects and features of the invention are apparent in the disclosure, which includes the above and ongoing written specification and claims, with the drawings.

DETAILED DESCRIPTION OF THE PREFERRED EMBODIMENTS

Figure 1:
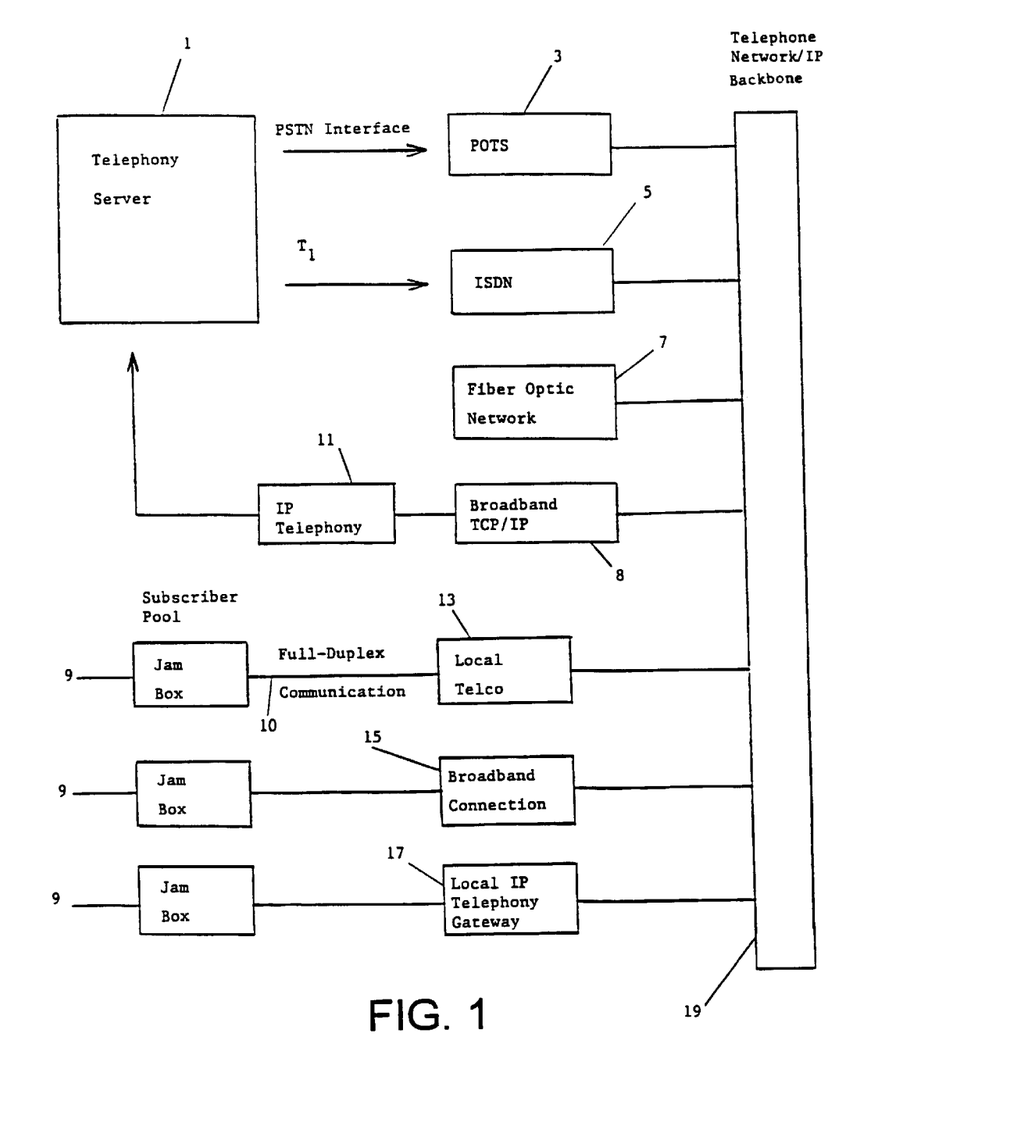
FIG. 1 is a block diagram of the Tele-Jam System.

The overall system architecture consists of a workstation (NT or Unix operating system) 1 that hosts and coordinates communications between several client apparatuses 9 via standard telephone service 3, ISDN 5, or other high data throughput communications channels, such as a fiber optic network 7 or the internet 8. Subscribers connect to the host server 1 via a telephone call (POTS of IP Telephony) and interact via an Interactive Voice Response (IVR) system, or a text-based menu driven application.

The system is programmed to operate and integrate efficiently. The host 1, via specially designed algorithms 21, 23, 25, 27 and 29 (FIGS. 2 and 4) coupled to commercially available telephony hardware 31 (FIGS. 2 and 4), appropriately coordinates and switches participants, such that musical groups are formed. The participants are thus able to musically interact in real-time.

FIG. 1 depicts the overall system architecture with several possible means of communication between subscriber apparatus 9 and host server 1. Preferred embodiments of communication between the host server 1 and the telephone network 19 include plain old telephone service 3, ISDN 5, a fiber optic network 7, and broadband TCP/IP 8 with IP telephony 11. Preferred embodiments of communication between the subscriber apparatus 9 and the telephone network 19 include plain old telephone service 13, a broadband connection 15 and a local IP telephony gateway 17.

The system, in some respects, will employ technology and methods similar to those used in conference calling and/or live "chat rooms". However, it departs from prior art in several key respects. The client apparatus 9 is dedicated to transferring digital information in a way that focuses on real-time full-duplex communications 10 as opposed to integrity of data. The algorithms used in forming the groups are complicated and unique in their purpose. Algorithms are used to scan the data sets of participants, to match participants to predetermined formats, to form groups based upon predetermined formats, and also to form groups based solely on the participants data set in a more spontaneous manner. The participants choice of which algorithm is used may also be part of the data set.

Figure 2:
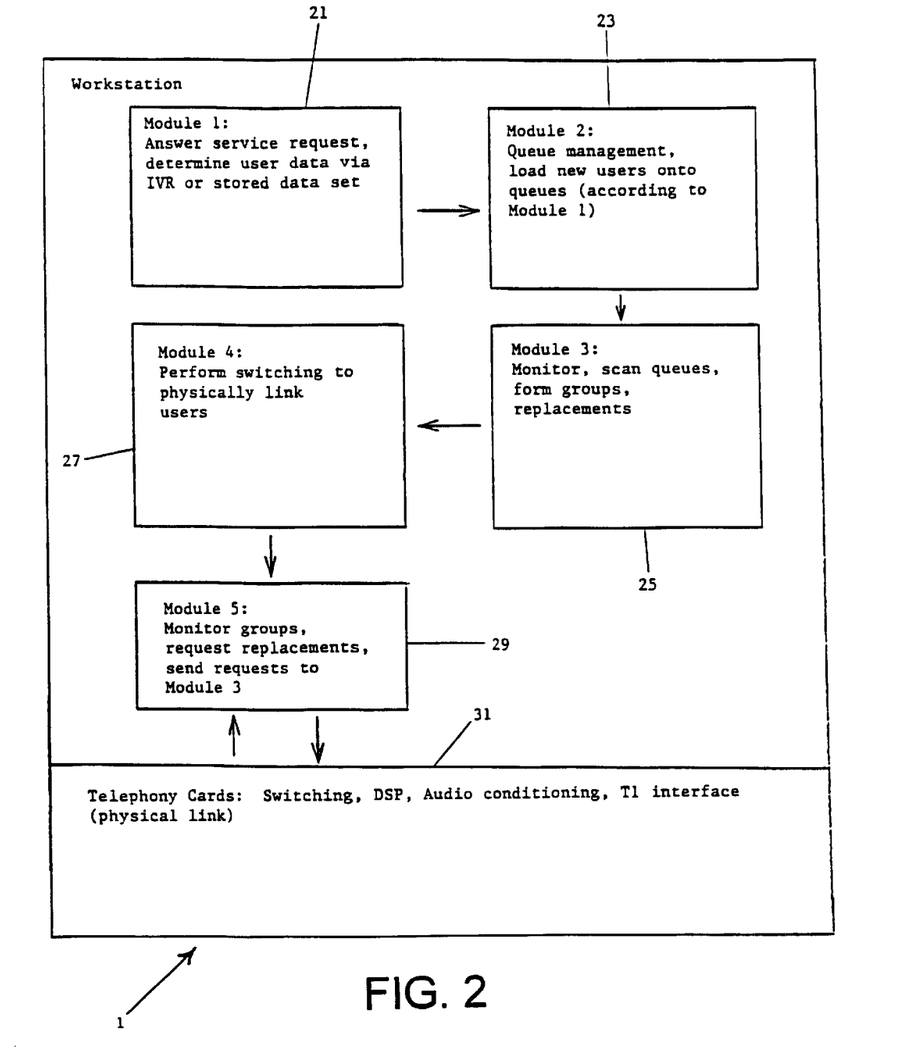
FIG. 2 is a block diagram of the host telephony server.

The Host Telephony Server 1 comprises a Unix or Windows NT based interactive server and commercially available telephony and digital communications hardware.

The host server establishes communications with a subscriber and queries the necessary information via an Interactive Voice Response system (IVR) for determining user identity and for determining to which group the subscriber will be switched.

Figure 4:
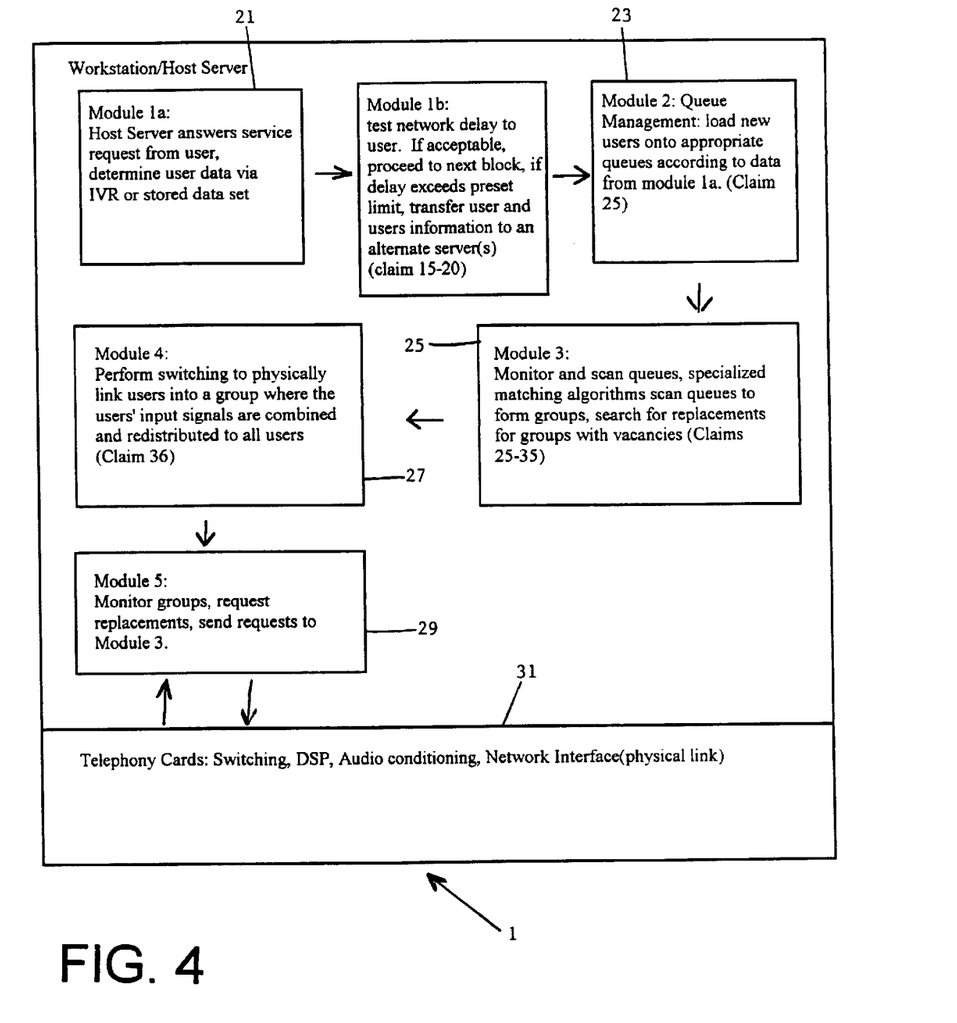
FIG. 4 is a block diagram of a host telephony server with various modules.

In a preferred embodiment, the Host Telephony Server 1 answers the subscriber's call and queries for user-ID and password with software "Module 1" 21. Once the subscriber has been validated against the server's database, the server queries which matching algorithm the participant would like to use, and whether to answer the musical profile questions (as programmed into the IVR, such as skill level, tempo, etc.) or retrieve a stored data record, one of several possible stored data sets. Also, a list of existing arrangements is available.

The users profile or selections are then sent to software "Module 2" 23 where they are loaded on an appropriate queue. Queues exist for different styles of music, such as rock, jazz, and others, and possibly for different formats within each style or genre, such as a queue for predefined jazz formats and a queue for spontaneous formation of jazz ensembles. Each matching algorithm may have its own set of queues. An additional algorithm or module manages the database and queues to allow better performance for the matching algorithms.

At "Module 3" 25, the matching algorithms scan the database queues and match participants into an appropriate group. Preferably, two or more algorithms may simultaneously scan each queue for each type of group generation. One may seek to form new complete groups. The other one simultaneously scans the database queue of new participants and a queue holding data corresponding to openings in existing groups or arrangements. For example, consider the spontaneous formation of jazz ensembles. Participants desiring to join a jazz ensemble by spontaneous formation are placed on the spontaneous jazz formation queue. The spontaneous formation matching algorithm then scans the queue to form groups, while the replacement algorithm scans the spontaneous formation jazz queue and the queue corresponding to openings in existing spontaneously formed jazz ensembles.

Additional instances of the same algorithm may be created, such that each instance is dedicated to scanning a single queue. For example, an instance of the spontaneous formation algorithm scans only the spontaneous formation rock queue. Or, if performance warrants, multiple instances of the same algorithm may scan the same queue.

There are at least three different exemplary ways in which to generate a group: spontaneous formation, pre-established format, and reserved studio. Other such groups are within the scope of this invention.

The first of the three types of group generation is "spontaneous formation". The spontaneous formation makes matches based loosely on the participant's desired group profile. The focus is mainly on the type of instrument the participant is playing and loosely on the type of musicians that will comprise the group. That inherently provides an environment for spontaneity, which is a key attribute of this type of group generation.

An algorithm makes the spontaneous formation matches as follows. It initializes a new "instance" of a data structure corresponding to a new empty group. It then scans the queue, which holds the participants that have chosen this algorithm, and randomly picks the first band member. That may be manipulated as required and may be somewhat limited, such as randomly picking a bass player as the foundation of the group. Next, the algorithm scans the queue for participants to fill the other vacancies in the group. That means first finding a participant with an instrument for which there is an opening, then matching somewhat subjective data elements such as style, tempo, etc. A data structure containing group identifiers such as, but not limited to, tempo, skill level, etc., may be updated as members are added to the group.

For example, pick a bass player. The bass player wants to play in a standard quartet. Search the queue for a drummer who wants to play in a trio/quartet, a guitarist who wants to play in a quartet, and a sax player or pianist who wants to play in a quartet. After a search of unmatched participants has been completed, those that have been selected are considered a group and are switched together by "Module 4" 27. If the format is significantly less than full, the participants are switched together and the group's data set placed onto a "partially complete" queue, where an algorithm within "Module 5" 29 matches the profiles of new participants against the vacancies in the group. In this situation, by means of spontaneous formation, the vacancy is decided by an algorithm that examines the group identifiers to determine the profile of the vacancy. That profile is then matched against the profiles of the participants waiting to be placed.

The participants are chosen by matching (approximately, or by best fit after scanning the entire queue) the data record of the participants. There may be many different permutations of the matching algorithms, varying from forming strict matches to loosely structured matches.

The second type of group generation is by pre-defined formats. Those formats are available/described via IVR or a web page. The web page may list the format and give a code for the format that may be entered via the IVR upon dialing in. A preexisting format provides the participant with a dependable known format for which they may practice. That may be advantageous for the musician who wants to count on playing a specific arrangement of a specific song.

A data structure corresponding to each of the pre-defined formats is initialized at system start-up. When a subscriber picks a certain pre-existing format, they populate the data structure. When the data structure is properly filled, it is sent to the switching module 27 and a new instance of the data structure is created and ready to accept new participants. For organizational purposes, participants selecting predefined formats may be placed on a predefined (jazz, rock or other) queue and the predefined format matching algorithm may populate the predefined format data structure with participants from the queue.

For example, there may be a pre-defined trio consisting of a bassist, guitarist, and saxophonist coded as, for example, format 1234. When a bassist desiring to play in the described trio dials in, they may select the trio by the code 1234. They are then added (their channel number and other data) to the data structure representing the trio. A guitarist desiring to play in the trio dials in and selects format 1234 and is also added to the data structure. When the data structure is complete, it is then passed to the switching module 27, which then reads the channel numbers out of the data structure and performs the appropriate switching.

If the format has not been fully populated after a search of available participants, the participants are switched together and the group's data set placed onto a "partially complete" queue. An algorithm then matches the profiles of new participants against the vacancies in the group. In this situation, the vacancy is decided by an algorithm that examines the profiles of the participants in the group to determine the profile of the vacancy, which is then matched against the profiles of the participants waiting to be placed.

A multitude of pre-defined formats may be programmed into the system, ranging from, but not limited to, rock to jazz to classical.

Another option that is programmed into the system is the concept of a reserved "studio." Several participants have an access code for dialing in and connecting to the studio at a specific time. That would be advantageous for groups that wish to rehearse from remote locations.

The above described scenarios effectively form groups of participants that may be switched and linked together via telephony conferencing hardware and software.

The telephony module 31 of the Host Telephony Server 1 provides the physical switching and linking together of participants comprising a group, receives the signal of each participant, mixes the signals, and returns the mixed signal to each of the participants. Module 31 performs basic audio processing to insure a quality signal. The basic function of the telephony module 31 may be similar to prior art in the teleconferencing industry. However, it is used in conjunction with the unique ideas, algorithms, and resulting software system herein to achieve the novel interactive real-time link of the multiple end users.

Commercially available hardware may accomplish standard conferencing, and commercially available DSP processing may accomplish the audio processing and mixing.

The different components may be customized in order to be integrated and to provide validation of the unique the Tele-Jam system.

Figure 3:
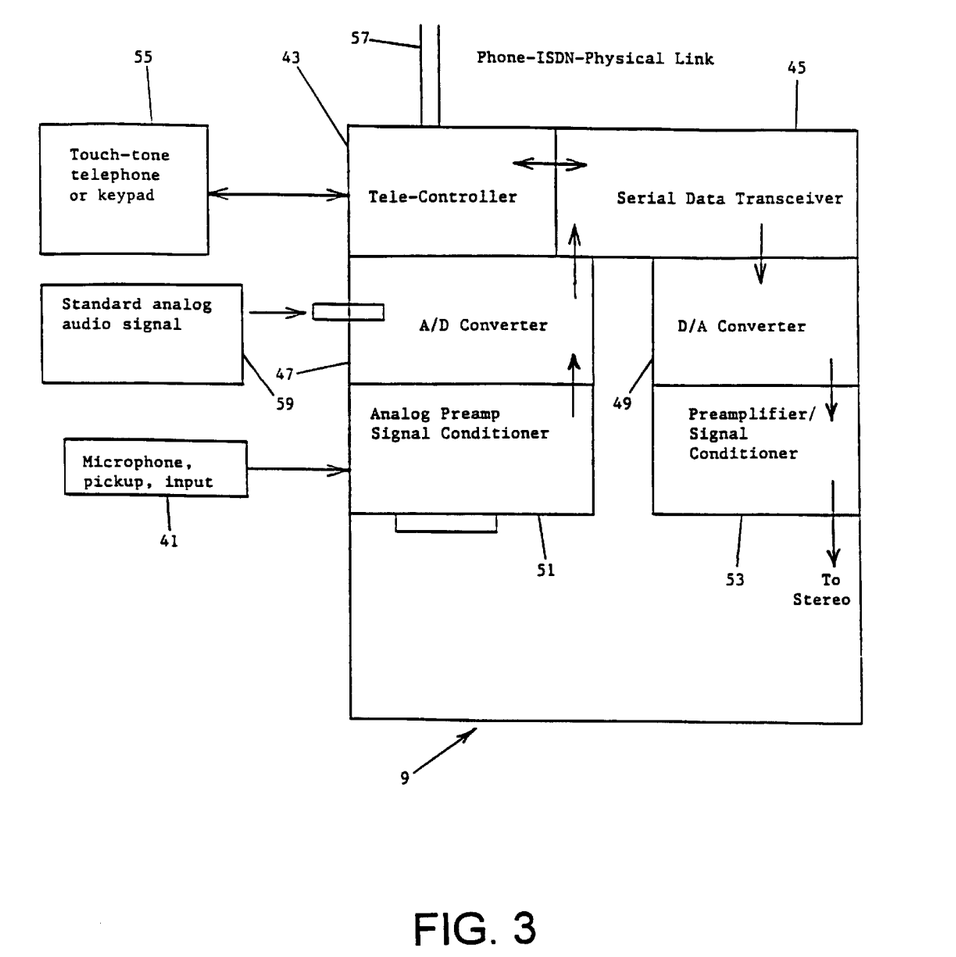
FIG. 3 is a block diagram of the client apparatus.

The client apparatus 9 is used by each participant to connect to the Host telephony Server 1, digitizes the musical signal generated by their instrument (if not already in digital format), sends the information to the server and receives the return signal corresponding to the inputs of all the group members.

For example, participants may use a microphone 41 to record an acoustic or electrically amplified instrument. The microphone 41 output is sent to the Jam-Box 9 (either directly via microphone 41 and analog preamp 51 or indirectly via stereo equipment 59). Other configurations are possible, such as a direct connection from a guitar amp to the client apparatus, sans a microphone.

The primary components of the Jam-Box 9 include a tele-controller 43, serial data transceiver 45, A/D converter 47, and D/A converter 49. Additional signal processing may be done by adding an analog preamp 51 and a preamplifier 53.

The telecontroller 43, in conjunction with a touch-tone telephone 55, or keypad integrated into the Jam-Box, is used to establish communication with the server 1. After the user provides a valid password and enters appropriate information, the telecontroller 43 connects the serial data transceiver 45 to the physical link 57 and thus to the server 1.

The serial data transceiver 45 facilitates the full-duplex exchange of digital information. It sends the participants data stream to the server 1 and receives the data stream that corresponds to the entire group from the server.

The Jam-Box 9 outputs the group's signal such that it may be amplified with common home or portable stereo equipment 59 (voltage=x, impedance=y). The group signal comes from the preamplifier 53. Stereo equipment 59 is for the user's input. For example, microphone 41 to tape deck 59 to client apparatus 9.

A "Group" is an instance of a data structure with data fields that hold information identifying or corresponding to particular participants to the system and hold group related information such as the format type as well as system information.

A "Format" is a template for group or ensemble with varying degrees of specificity (depending on the algorithm it is associated with) of differing characteristics: for example, number of participants, range of values for total number, types of instruments, musical key, tempo, skill level, etc.

Due to the real-time nature of the application, it is optimal to minimize network delays. A preferred embodiment is a multiple server system with servers located in different geographical areas, and/or servers dedicated to different networks such as ISDN, IP over standard telephone infrastructure, or IP over cable TV network. These servers may be connected to each other via a TCP/IP intranet.

With the rapidly increasing technology advances in the field, and the increased bandwidth and switching speeds, it may have users from different networks able to interact in real-time. It may happen that the number of participants on a given server (primarily dedicated to one network type) at a given time may not be sufficient to fill groups (as discussed herein). Also, given the distributed nature of the overall system, it is possible for participant to connect to a primary or default server with which there is an unacceptable network delay (possibly sporadic in nature), or another server with which it has an acceptable network delay.

If network delay exceeds a preset limit for real-time interaction, the participant can be switched to another server in the network based on geographical proximity to the secondary server, or anticipated network delay to that server determined via a programmed lookup of network topology (number of routers and types of networks or systems and media that data must traverse) as discussed here in section 1c.

Likewise, if a participant has acceptable network delay but cannot be matched into a group, the server can transfer the participant to a server with openings that fit the participant and also possess acceptable network delay by methods detailed herein. The methods proposed here provides the means by which to overcome this problem.

If a participant is unable to be matched in their primary system, then their primary server broadcast a data object corresponding to the user to a list of alternate servers determined by network or geographical proximity, with a likelihood of having acceptable network delay. If the participant can be matched to a group on an alternate server and a network delay test is successful, the server sets a flag corresponding to a match and records the GMT of the match in the participants local data object. The server then notifies the original server and other alternate servers, either directly through broadcast to them or relayed through the original server, to drop the participant from its queue(s).

First method of notification: Upon a successful match and network delay test, the alternate server notifies the original server with a message (in data packet TCP/IP form) that once the original server receives the participant control request from the alternate server, it responds to that alternate server granting control of the participant, and notifies the other alternate servers to drop the participant from it's queue(s). Thus the first alternate server to respond to the original server will gain control of the participant.

A preferred embodiment includes a host system and methods for accepting connections (single or multiple), (secure or otherwise), from client electronic apparatuses (users) via an electronic data network (circuit switched plain old telephone network or packetized internet protocol (TCP/IP or UDP) network over standard telephone lines or cable or packetized ATM network), classifying users based on queried, experimentally detected, or previously stored data including network data transfer delay, placing an instance of a data structure corresponding to the user (user's data) on a queue corresponding to the particular classifications, arranging users into groups via specialized algorithms acting on the supplied and/or detected information, and subsequently switching/bridging together and combining the data streams (audio signals) from each client apparatus of the group(s) which was formed, and returning the resultant combined data stream (signal) to each client apparatus to achieve real-time full-duplex musical interaction.

Querying data from users of client apparatuses via an interactive voice response system (or web page, stored data or combinations thereof: Module 1 (21)) including musical characteristics of the user (instrument, tempo, musical key, skill level etc.) the desired session or format (predefined or spontaneous) which they want to join, and the participants physical location and/or computed data transfer time delays.

Participants selecting a particular format or matching algorithm are prompted for descriptive musical characteristics, such as instrument, desired key, tempo etc. The selections must match or be recognizable by the system, which will hold a published list of acceptable values.

An automated method or methods to detect musical characteristics of the participant by analyzing a sample of their signal for frequency, timbre, tempo, musical key.

A method to determine data transfer time delays (latencies) due to physical distance and/or network delays and network topology such as the number of switches/routes through which data must pass or due to the route about which the number of potential bottlenecks can be calculated via a lookup of network topology and/or due to an experimental network delay test to the client apparatus to determine practical latency thereby determining "effective network proximity" or network latency between the host and client apparatuses) and to using this quantity as a constraint in the formation of groups of users.

Experimental Network Delay Test consists of: Notify client apparatus of Network Delay Test. Client apparatus responds to Server that it is ready for Network Delay Test. Server sends test data UDP packet including originator network address and time stamp corresponding to time sent to the client apparatus; client apparatus receives test packet, reads originator address, adds time stamp (or does not add time stamp) and sends packet back to the server. Server receives response test packet from client apparatus and marks time received. Time difference is used to compute network latency.

A method to form groups of participants based network delay (latency). Participants connect to a main server (or regional/remote server). If a group is formed and all participants possess a connection with an acceptable network delay as determined by network delay test, then switching/bridging proceeds. If network delay is excessive for real-time interaction as determined by network delay test, the participant(s) is placed on a queue to be analyzed,/'assigned to another group or server with which the participant has a lower network delay. Alternatively, the participant can be classified with respect to network delay upon initial login to the system.

A method as follows: If participant is unmatched due to network delay or other factors: Select list of alternate servers with anticipated acceptable network delay (as determined by methods described herein). Broadcast data object corresponding to the participant to the list of alternate servers. The alternate servers then operate on the data object and proceed with matching, including network delay test (send/receive UDP packet) with client apparatus. If the apparatus makes a match it notifies the original server which then drops the participant from its queue and broadcasts to the remaining alternate servers to drop the participant. The original server responds to the alternate server which first notified it that it has control of the client and then notifies the client apparatus with the network address (or phone number in case of PSTN connection) of the server to which it will connect. The alternate server then proceeds with matching processes and call setup to the client apparatus.

When a match is successfully completed the server notifies the client apparatus, which will implicitly or explicitly ignore subsequent notifications by other servers with a "busy signal".

If a group on any given server can be identified that is within acceptable proximity to each other via a remote server, then the group can be switched to the remote server. A second Network delay Test can be implemented to verify that the participants are within acceptable proximity with respect to network latency. The remote server will then establish connections to the individual participants (their apparatuses) and perform signal combination processing and redistribution as discussed herein.

A method to use data to classify users into groups such that all members of a particular group have an acceptable latency for real-time interaction. This method may re-invoke the method described earlier.

A method to use information gathered or detected as before, to classify users and place users on appropriate queues (or in appropriate pools) (Module 2, 23) to be searched by matching algorithms (based on the format and/or the type of matching algorithm selected by the user). (Module 3, 25).

Step One: Classify user based on type of matching algorithm used and place user on master queue for the corresponding type of matching algorithm or Step Two: Further classify user based on instrument type and other major group forming characteristics (key, tempo, etc.) and place user on sub-queues (one of many corresponding to the matching algorithm type) corresponding to one or more major characteristics.

Criteria for (being placed on) the sub-queues would be manually programmed into the system or automatically selecting the predominant group forming characteristics as determined by statistical analysis of the characteristics of the participants (users) on the master queue of a matching algorithm.

Specialized matching algorithms which evaluate data (matching criteria) corresponding to musical characteristics of each participant and subsequently create groupings corresponding to a chosen predefined format of varying degrees of specificity or a loosely structured spontaneous format.

Driving telephony or communications switching hardware and audio processing subsystems to accomplish the following: combine the incoming audio data from each client apparatus of the group (ensemble) and redistribute the combined signal/'data to each client apparatus in full-duplex real-time or quasi-real-time fashion such that all participants can hear all other participants in real-time, including or excluding each participants signal in the return signal representing the ensemble, and including or excluding necessary echo cancellation—to achieve (the effect of) real-time musical interaction between the participants corresponding to each client apparatus:

A method to synchronize incoming signals from the individual participants and drop data packets that exceed delay/latency requirements.

A method to monitor groups (conferences) and replace dropouts with suitable replacements by searching queues (pools) of unmatched participants where a suitable replacement is based on the characteristics (stored in data structures) of the remaining participants and the goal or intent of the initial algorithm which formed the group. The replacement algorithm can reinvoke the original matching algorithm which was implemented to form the original group.

Algorithms: (predefined format, spontaneous formation, varying degrees thereof . . . )

General search mechanism common to all matching algorithms:

The following manner is one possible implementation to achieve the preferred embodiment: The algorithm steps through the queue: at each participant the algorithm reads a code corresponding to the predefined format and checks to see if there is an instance of that particular format which is in the process of being filled and also checks the vacancy queue to see if there is a current group of that format which has a vacancy which matches the current.participant under evaluation. If there is no partial group existing, a data structure corresponding to the group is initiated and the first member is added to the appropriate slot in the new instance. The algorithm subsequently picks members who selected the format in question and correspond to the remaining slots to complete an instance of the format. If an instance is not complete within a programmable number of passes of the necessary queue(s), then the instance is placed on the partially complete queue. If the instance is filled, it is passed to 1 g for further processing and switching.

Also, it could be established that the formation algorithm cannot use the participant until the replacement algorithm has passed over and checked the participant against current vacancies, setting a flag on the process if a participant does not match. This gives priority to current groups with vacancies.

A "Spontaneous Formation" algorithm which searches queues of unmatched participants and selects members on a quasi-random basis. The spontaneous matching algorithm scans the queue or pool of users and randomly, (or quasi-randomly by introduction of a "seed value" such as randomly pick a player with a particular instrument) selects the first member of the group. A data structure corresponding to the group is instantiated and the first member is added to it. The algorithm then randomly picks from a preprogrammed list the rule by which it will select the second member of the group. The rule can be straight forward logic: if x then y; Or the rule can act on arithmetic and statistical analysis of numerical values assigned (corresponding to) to the characteristics of the members already selected, and on the characteristics of prospective participants. Or any combination of rules related to or operating on the musical characteristic data of the participants.

This process is repeated until the instance of the group reaches an arbitrary preset limit. The group's data structure is then passed to the switching module which switches the group's inputs together.

A "Loosely Predefined Format" algorithm to search queues (pools) of unmatched participants and select participants that possess descriptive attributes that match to a degree specified in the algorithm the specified predefined format and match a corresponding open slot in the instance of the format.

The algorithm implementing this method searches a queue(s) or pool of users whom have chosen a particular format. The algorithm selects participants to fill instances of the predefined formats which they have chosen by utilizing rules and programmed comparisons of a participant's characteristics to the specifications of the chosen format in combination with comparisons to the characteristics of group members already selected as determined by analysis of the participants signal's or by information (selections) previously prompted from the user(s).

A participant chooses a predefined format of "jazz type y" which is specified as: quartet or small ensemble with a particular tempo (slow, medium, fast etc.) and/or a particular musical key. Participants then designate the instrument which they play.

Participants are then placed on a queue (or in a pool) for loosely predefined formats of type "jazz type y". The algorithm implementing this method then searches the queues and selects participants to fill instances of the predefined formats which they have chosen by utilizing (rules based evaluation) programmed comparisons of a participant's characteristics to the specifications of the chosen format in combination with the comparisons to the characteristics of group members already selected.

A "Strict Predefined Format" algorithm to search queues (pools) of unmatched participants and select participants whose characteristics exactly match the strict predefined format and match a corresponding open slot in the instance of the format (implemented as a data structure).

For example: "jazz quartet type x" is published as bass, keyboard, horn, and guitar in key of B-flat. Participants connect and request "jazz quartet type x", participants placed on queue for that predefined type. Algorithm scans queue, if it finds a participant who selected "jazz quartet type x" and there are no partially filled instances of that type, a new data structure instance is instantiated and the first member is placed in the appropriate slot in the data structure. The algorithm subsequently picks members who selected "jazz quartet type x" and correspond to the remaining instruments to complete an instance of "jazz quartet type x". If an instance is not complete within a programmable number of passes of the necessary queue(s), then the instance is placed on the partially complete queue. If the instance is filled, it is passed for further processing and switching.

An apparatus to establish a connection to the server via POTS, ISDN, IP over PSTN or Cable T/1 etc. to facilitate transfer of outgoing signal and simultaneously receiving the outgoing signal combined with signals of the other participants in the group or to facilitate the transfer of the outgoing signal and simultaneous reception of the combined signal of all other participants in the group.

The apparatus will display visually and/or aurally information from the server prompting the user for id/password and IVR prompts for the participants matching characteristics and provide keypad to type or select responses.

After initial telephony connection (circuit switched or connectionless) is established:

A method to receive,/send UDP packet test signal for purposes of determining network delay in transmitting data between server and client apparatus which matches the method described earlier.

A method to transfer session setup information (matching information) (collected as described above) between the server/client apparatus. Once session setup is complete, stream data as follows: participants data stream transmitted to the server and the combined signal of the group transmitted by the server to the client apparatus.

While the invention has been described with reference to specific embodiments, modifications and variations of the invention may be constructed without departing from the scope of the invention.

I claim:

1. A tele-jam method comprising:
   providing a host system, connecting the host system to a network of multiple interactive user devices and to multiple servers,
   compiling data for storing in and retrieving from the host system,
   inputting request by user devices, transferring the request to the host system, classifying the request and maintaining a queue of multiple user requests,
   matching the request with other user requests to form data signals,
   forming a group of matched requests, switching and bridging together and combining the data signals from each user of the group, and
   returning the combined data signals to each user device for achieving real-time full-duplex musical interaction.

2. The method of claim 1, wherein the connecting the network is for connecting single or multiple users.

3. The method of claim 1, wherein the connecting the network is an electronic data network selected from a group comprising circuit switched plain old telephone network, packetized internet protocol (TCP/IP or UDP) network over standard telephone lines, and cable or packetized ATM network.

4. The method of claim 1, wherein the classifying further comprises classifying users based on queried, experimentally detected, or previously stored data including network data transfer delay, placing an instance of a data structure corresponding to a user's data on a queue corresponding to particular classifications, and wherein arranging users into groups comprises arranging via specialized algorithms acting on the supplied and/or detected information.

5. The method of claim 1, further comprising querying data of requests from users via an interactive voice response system or web page, or stored data or combinations, including musical characteristics of the user request, finding a desired session or format to join, and determining users physical location, and computing data transfer time delays.

6. The method of claim 5, wherein the format is a predefined format.

7. The method of claim 5, wherein the format is a spontaneous format.

8. The method of claim 5, wherein the musical characteristics comprise instrument, tempo, musical key, and skill levels.

9. The method of claim 1, further comprising prompting the users for selecting descriptive musical characteristics.

10. The method of claim 9, wherein the selecting comprises providing characteristics including instrument, musical key, tempo, skill levels, and matching the selected characteristics within a database of stored information within the host system.

11. The method of claim 1, further comprising automatically analyzing a sample of user inputs and detecting musical characteristics of input signals for frequency, timbre, tempo, musical key, and skills.

12. The method of claim 1, further comprising determining data transfer time delays corresponding to physical distance, network delays and network topology including number of routes through which data must pass, calculating number of potential bottlenecks via a lookup of network topology and experimental network delay test, determining practical latency thereby determining effective network proximity or network latency between the host system and user devices, using the determined latency as a constraint in formation of groups of users.

13. The method of claim 12, wherein the calculating the experimental network delay test comprises notifying user device of network delay test, responding to a server ready for network delay test, sending test data UDP packet including originator network address and time stamp corresponding to time sent to the user device which receives a test packet, reading originator address, and sending packet back to the server, the server receiving response test packet from the user device and marking time received, and computing network latency with the marked time difference.

14. The method of claim 13, wherein the forming groups of participants based network delay or latency comprises connecting participants to a server, determining if a group is formed and if all participants possess a connection with an acceptable network delay as determined by network delay test, and proceeding with the switching/bridging.

15. The method of claim 14, further comprising determining excessive network delay for real-time interaction by the network delay test, placing the participants on a queue, analyzing and assigning to another group or server with which the participant has a lower network delay.

16. The method of claim 14, further comprising determining if participant is unmatched due to network delay, selecting list of alternate servers with anticipated acceptable network delay, and broadcasting data object corresponding to the participant in the queue to a list of alternate servers, operating the alternate servers on the data object, matching the alternate server including network delay test (send/ receive UDP packet) with the user device, notifying the matching to the original server for dropping the participant from the queue and broadcasting to remaining alternate servers to drop the participant.

17. The method of claim 16, further comprising having the original server respond to the alternate server which first notified it that it has control of the client, notifying the user device with a network address of the server to be connected, proceeding with the alternate server to match processes and call setup to the user device.

18. The method of claim 17, further comprising notifying the user of a successfully completed match via the server thereby ignoring subsequent notifications by other servers with a busy signal to avoid interruption.

19. The method of claim 18, further comprising switching an identifiable group on any given server within acceptable proximity to each other to a remote server, implementing a second network delay test to verify that the participants are within acceptable proximity with respect to network latency, establishing connections with the remote server to individual participants and user devices and performing signal processing and redistribution.

20. The method of claim 14, further comprising classifying users into groups such that all members of a particular group have an acceptable latency for real-time interaction.

21. The method of claim 1, wherein the classifying comprises classifying the user based on type of matching algorithm used and placing user on master queue for corresponding type of matching algorithm.

22. The method of claim 1, wherein the classifying comprises classifying the user based on instrument type and group forming characteristics and placing user on sub-queues corresponding to a matching algorithm type with at least one major characteristic.

23. The method of claim 22, further comprising programming criteria for being placed on the sub-queues into the host system, automatically selecting predominant group forming characteristics determined by statistical analysis of the characteristics of the users on a master queue of a matching algorithm.

24. The method of claim 1, further comprising driving telephony or communications switching hardware and audio processing subsystems, combining incoming signal data from each user device, redistributing combined signal data to each user device in full-duplex real-time or quasi-real-time manner for all participants to hear all other participants in real-time, selectively including or excluding each participant's signal in a return signal representing an ensemble, and selectively including or excluding echo cancellation for achieving real-time musical interaction between the participants corresponding to each user device.

25. A method of real-time full-duplex musical interaction comprising:
   providing a host system with plural servers, connecting multiple users to the host system, providing a database of user information in the host system,
   inputting data requests from users with varied musical characteristics,
   allowing a database algorithm to determine queues of user requests, reading for each participant a code corresponding to a predefined format, checking to see if there is an instance of a particular requested format in the process of being filled,
   checking vacancy queue to see if there is a current group of the requested format which has a vacancy which matches the participant under evaluation,
   initiating a data structure corresponding to the group if there is no partial group existing, and
   adding a first member to an appropriate slot in a new instance.

26. The method of claim 25, further comprising picking up members selecting a desired format, completing an instance format by filling remaining slots, placing the instance format on a partially complete queue if an instance is not complete within a programmable number of passes of the necessary queue(s), passing the instance format to the host system for further processing and switching.

27. The method of claim 26, further comprising setting a flag on a process so that the algorithm cannot use the participant until the replacement algorithm has passed over and checked the participant against current vacancies thereby giving priority to current groups with vacancies.

28. The method of claim 26, further comprising a spontaneous formation algorithm for searching queues of unmatched participants, selecting members on a quasi-random basis, scanning the queue with the spontaneous matching algorithm and randomly selecting a first member of the group, initiating a data structure corresponding to the group, adding the first member to the group, randomly picking up defaults from a preprogrammed list for selecting a second member of the group.

29. The method of claim 28, wherein the picking the defaults comprises analyzing arithmetic and statistical numerical values assigned to characteristics of members already selected and characteristics of prospective participants.

30. The method of claim 29, further comprising repeating the selecting and picking until the instance of the group reaches a preset limit for passing the group data structure to a switching module for grouping user inputs together.

31. The method of claim 25, further comprising searching queues of unmatched participants with a loosely predefined format, selecting participants having descriptive attributes that match to a degree specified in the algorithm, and matching a corresponding open slot in the instance of the format.

32. The method of claim 31, wherein the algorithm searches a pool of users choosing a particular format, selecting participants to fill instances of the predefined formats chosen by default settings and programmed comparisons of participant characteristics to specifications of the selected format in combination with comparisons to the characteristics of group members already selected as determined by analysis of the participants signal's or by selections previously prompted from the user(s).

33. The method of claim 31, further comprising choosing a predefined format with desired specifications of ensemble, musical keys and characteristics and designating instrument to be played by the participant.

34. The method of claim 33, further comprising placing participants on a queue for the chosen predefined format, searching database and other queues, selecting participants to fill instances of predefined formats by utilizing programmed comparisons of a participant's characteristics to the specifications of the chosen format in combination with comparisons to the characteristics of group members already selected.

35. The method of claim 25, further comprising choosing a strict predefined format, searching queues (pools) of unmatched participants, selecting participants with characteristics exactly defined in the strict predefined format and matching a corresponding open slot in an instance of the format for implementing as a data structure.

36. A tele-jam system comprising a host system, servers connected to the host system, client electronic apparatuses connected to the host system by electronic data network, a database of characteristics stored in the host system, the characteristics including musical details, queries, responses triggered by queries for classifying users based on queried, experimentally detected, or previously stored data including network data transfer delay, data streams formed from user's input data, queues corresponding to the particular classifications, groups of arranged users, specialized algorithms in the system for acting on the supplied and/or detected information, and means for subsequently switching/bridging together and combining the data streams (audio signals) from each client apparatus of the formed group(s) and returning the resultant combined data stream (signal) to each client apparatus for achieving real-time full-duplex musical interaction.

37. The system of claim 36, wherein the electronic data network is selected from a group consisting of circuit switched plain old telephone network, packetized internet protocol (TCP/IP or UDP) network over standard telephone lines, cable, and packetized ATM network.

38. The system of claim 36, wherein the client apparatus comprises an interactive host-client communication device, a connection for connecting the client apparatus and the servers via POTS, ISDN, IP over PSTN or Cable TV, the communication device having means for simultaneously sending outgoing signals and for receiving incoming signals of other users of the host system for achieving real-time full-duplex musical interaction.

39. The system of claim 38, wherein the client apparatus further comprises an audio-visual display for displaying information from the server and prompting the user for id/password and IVR prompts for the participants matching characteristics and an input device for inputting desired requests.

40. The system of claim 36, further comprising an interactive voice response system connected to the client apparatus for communicating user input requests including musical characteristics of the user, desired session or format to join, and participants physical location and/or computed data transfer time delays to the host system.

41. The system of claim 36, further comprising musical instruments connectable to the client apparatus for allowing participation in real-time full-duplex musical interaction with other users.

42. The system of claim 36, further comprising a processor for detecting musical characteristics of signals input by users and a computing device for analyzing the signals for musical characteristics including frequency, timbre, tempo, musical key.

43. The system of claim 36, further comprising amplifiers connectable to the client apparatus for amplifying signals received from the host system.

* * * * *